United States Patent [19]

Wommack

[11] 3,747,416
[45] July 24, 1973

[54] DENSITY MEASUREMENT APPARATUS
[75] Inventor: Walter C. Wommack, Marshall, Tex.
[73] Assignee: Thiokol Chemical Corporation, Bristol, Pa.
[22] Filed: July 17, 1972
[21] Appl. No.: 272,526

[52] U.S. Cl. ................................................ 73/437
[51] Int. Cl. ............................................ G01n 9/10
[58] Field of Search ...................... 73/437, 433, 435, 73/436, 32 R

[56] References Cited
UNITED STATES PATENTS
2,650,494  9/1953  Linhorst ............................... 73/437
FOREIGN PATENTS OR APPLICATIONS
1,215,850  12/1970  Great Britain ........................ 73/437

Primary Examiner—James J. Gill
Attorney—William R. Wright, Jr.

[57] ABSTRACT

An apparatus or machine is presented which measures the density of a solid material by weighing it in air and then weighing it submerged in mercury after which the density is obtained by simple calculation. The use of mercury as the displaced fluid medium enhances the accuracy of the measurement. The sample is supported by thin rods on a weighted member and is forced below the surface of the mercury by the weighted member thus overcoming any natural tendency to float which the specimen and the related apparatus may have. The device is calibrated to account for the small displacement of the supporting rods.

3 Claims, 2 Drawing Figures

DENSITY MEASUREMENT APPARATUS

BRIEF DESCRIPTION OF THE INVENTION AND DISCUSSION OF THE PRIOR ART

The present invention relates to a device for determining the density of a solid material by the measurement of the quantity of a displaced fluid in which it has been immersed. It relates more particularly to such a device wherein the fluid employed is mercury.

Displacement type density measurement devices in use prior to the present invention have employed fluids such as water which disadvantageously wet a container and evaporate quickly, and are of low specific gravity thus reducing the accuracy of the density determination of the sample being tested. The present invention however, utilizes mercury as the displaced fluid. Mercury does not wet a container, does not evaporate as rapidly as water and gives more accurate results because of its great specific gravity.

OBJECTS OF THE INVENTION

It is, therefore, an object of the present invention to provide an improved fluid density determination apparatus and method which utilizes mercury as the displaced fluid.

It is also an object of the present invention to provide an apparatus of the foregoing type wherein an improved specimen mount is included which ensures complete submersion of the specimen in the mercury with little displacement of its own and with little or no amalgamation effect.

It is also an object of the present invention to provide an apparatus for the measurement of density of a solid specimen which gives an improved accuracy of measurement by the utilization of a much more dense fluid than has been used for this purpose heretofore.

Other objects and advantages of the present invention will become apparent from the detailed description of a preferred embodiment contained in the specification and from the claims which follow.

DESCRIPTION OF THE PREFERRED EMBODIMENT

Figure 1:
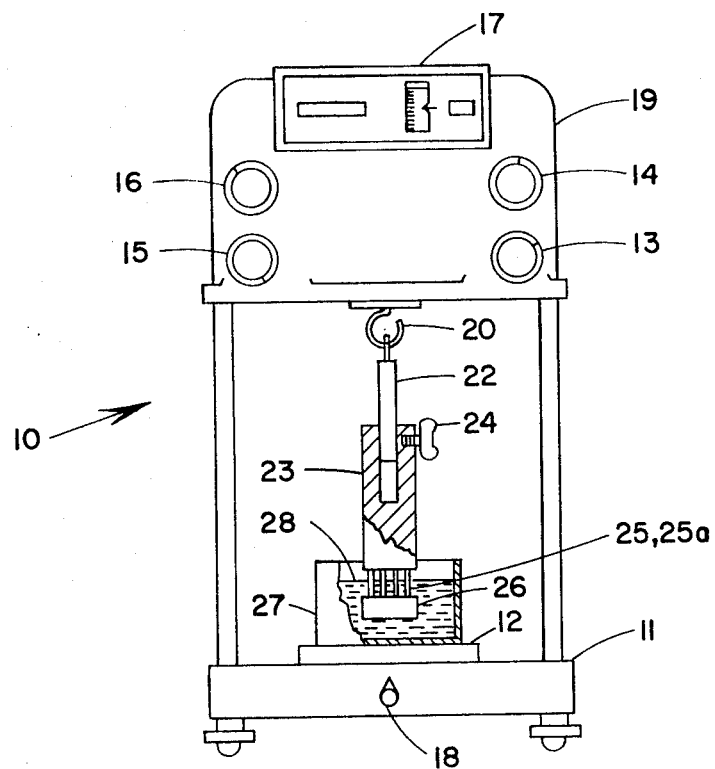
FIG. 1 is a view of a precise weighing apparatus showing the specimen mounted and submerged in the fluid.
Figure 2:
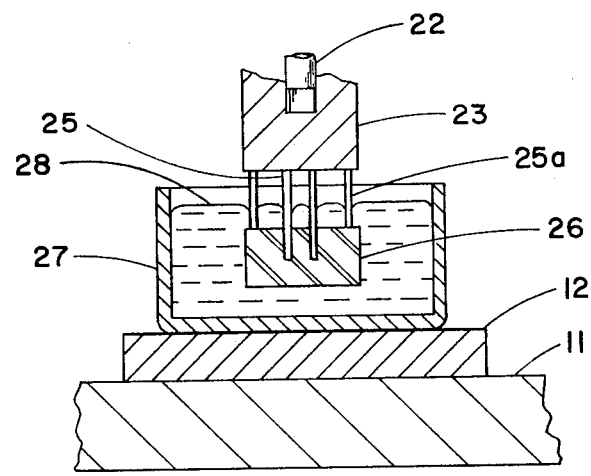
FIG. 2 is an enlarged cross-sectional view of the fluid cup specimen and the specimen mount.

In a preferred embodiment of the present invention, and with particular reference to FIG. 1 of the drawings, a precise weighing means, with a total capacity of 150+ grams may be used. This apparatus, generally designated by numeral 10, consists of a balance or scale which includes a frame, numeral 11, and a variable thickness support, numeral 12. The weighing provisions are contained in a housing, numeral 19, and have manually operated weighing addition and subtraction knobs, 13 being for 0.1 to 0.9 grams, 14 being for 1 to 9 grams, 15 being for 10 to 90 grams, and 16 being for 0 to 100 grams. Numeral 17 designates an illuminated vernier scale for the final reading when the weighed material is finally balanced. The illumination and balance lock switch, numeral 18, is turned counterclockwise to activate the illuminator and balance mechanism and it is turned clockwise to lock the mechanism. The vernier, item 17, is read to the nearest 0.1 milligram (0.0001 gram).

As will be seen from FIG. 1, rod 22 enters a cylindrical chamber in a combined weight and specimen support 23 and is slidable therein but adjustable by means of wing nut 24 which can be loosened to allow rod 22 to slide in support 23 or be tightened to hold it at any selected position. Extended downwardly from the base of support 23 and attached to it by welding or other suitable attachment are slender rods or prongs 25 and 25a preferably made of a material which will not amalgamate with mercury to any appreciable extent or which can be coated with polytetrafluoroethylene or the equivalent so that the mercury will not adhere to them. Other material may be used if the extent of the amalgamation is corrected for when the density of the specimen is determined. Several rods or prongs 25, are longer in length than are the others, 25a, and these longer ones extend into tight-fitting holes in specimen 26 so that specimen 26 is held to them securely. The remaining shorter rods, 25a, do not enter the specimen but serve as stops where they bear upon the upper surface of specimen 26. The weight of parts 22, 23, 24, 25 and 25a is limited only by the capacity of the weighing apparatus and the weight of a balance pan which is normally a part of the weighing apparatus and has been removed during this use. The weight is determined by the type of material used (usually a metal) and the dimensions of the various parts. The nearer the weight approaches the maximum permissible for the balance the less is the effect of "mercury drag" on the support pins. In any event, the minimum weight must be greater than the weight of the mercury displaced by the sample plus the weight of the removed pan.

Located directly below specimen holder 23, and resting upon the base 12, is cup 27 preferably internally coated with polytetrafluoroethylene and filled with mercury 28 to a level which will allow the specimen 26 to be fully submerged in the mercury without overflow of the cup 27.

OPERATION OF THE PREFERRED EMBODIMENT

In operation, the density apparatus, 22, 23, 24, 25, and 25a, is hung from the hook 20. The cup 27 is placed on the base 11 under the density apparatus. Shim or shims 12 may be used if found convenient in adjustment of the position of pan 27. The mercury container pan 27 is filled with clean dry mercury 28 to a height to insure that later submersion of the specimen 26 will not cause overflow of the mercury. Adjustment is then made of the length of the density apparatus and the height of the mercury container in such a way as to immerse the prongs on the apparatus to within ¼ inch of the bottom of support 23. An apparent balance weight of the apparatus with prongs 25 and 25a submerged in mercury is then taken and the weight is recorded as tare weight.

The weight of the sample 26 is determined dry in air on any convenient balance capable of measurement to the nearest 0.001 gram and this weight is recorded as weight of sample in air ($W_a$) and is used in later calculation.

With the tare weight and the weight of the sample in air established, the specimen 26, which may be a solid propellant sample for instance, is placed on the long prongs 25 and then is brought up against short prongs 25a. Suppport 23 with specimen 26 attached to it is then slid onto rod 22 in the manner shown in FIG. 1 and is adjusted to that height which will allow the specimen 26 to be submerged fully below the surface of the mercury 28 but not touching the bottom or sides of the cup. Cup 27 is placed under holder 23 with the mercury 28 in it and specimen 26 is allowed to fully submerge in the mercury, the specimen being forced into the mercury principally by the weight of holder 23.

A balance is taken with the specimen 26 submerged in the mercury. The tare weight is subtracted from this reading, and the resulting weight is the weight of the sample in mercury ($W_w$). Calculation of the density of the specimen 26 can be made in accordance with the following formula:

$$D_s = W_a/W_a + W_w (D_{hg})$$

where
- $D_s$ = density of sample
- $W_a$ = weight of sample in air (dry)
- $W_w$ = weight of sample in mercury
- $D_{hg}$ = density of mercury at test temperature As will be seen from the foregoing paragraphs, the accuracy of the measurement of the density of the specimen or sample is greatly enhanced over that achievable by the use of other liquids of much lighter specific weight, and, in fact, should be improved over a water system by a factor of ten since mercury is ten times heavier than water.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore to be limited only as indicated by the scope of the following claims.

I claim

1. A machine for the measurement of the density of a solid material specimen comprising a precise weighing apparatus, adjustable for tare weight, a weighted specimen holder attached to the balance hook in place of a balance pan and extended downwardly therefrom, specimen attachment prongs extended downwardly from said holder, the combined weight of the holder and prongs being greater than the weight of the mercury expected to be displaced by the sample plus the weight of the balance pan it replaces, a cup containing mercury and located below said holder, a specimen retained by said prongs and adapted to be submerged in said mercury whereby the weight of the specimen in air and submerged in the mercury can be obtained and the density of the specimen calculated.

2. The invention set forth in claim 1 with the specimen holder adjustable in height.

3. The invention set forth in claim 1 with the prongs coated with polytetrafluoroethylene.

* * * * *